United States Patent
Johnson

(10) Patent No.: US 7,401,969 B2
(45) Date of Patent: Jul. 22, 2008

(54) APPARATUS AND METHODS FOR SECURING DISCHARGE CHUTES ON MIXING VEHICLES

(76) Inventor: Brian Keith Johnson, 5925 Henry St., Maple Plain, MN (US) 55359

( * ) Notice: Subject to any disclaimer, the term of this patent is extended or adjusted under 35 U.S.C. 154(b) by 377 days.

(21) Appl. No.: 11/177,445

(22) Filed: Jul. 7, 2005

(65) Prior Publication Data

US 2007/0008814 A1    Jan. 11, 2007

(51) Int. Cl.
    *B28C 5/42*    (2006.01)
    *B01F 15/02*    (2006.01)
(52) U.S. Cl. .................. 366/68; 193/4; 193/10
(58) Field of Classification Search .............. 366/44, 366/68; 81/301, 321; 294/106; 254/93 HP; 269/20, 22, 25, 254 CS; 193/4–6, 10
    See application file for complete search history.

(56) References Cited

U.S. PATENT DOCUMENTS

| | | | | |
|---|---|---|---|---|
| 321,618 A | * | 7/1885 | Ludwick | 248/310 |
| 1,322,370 A | * | 11/1919 | Strathern | 269/218 |
| 1,428,679 A | * | 9/1922 | Caswell | 294/118 |
| 1,470,055 A | * | 10/1923 | Butler | 188/43 |
| 2,747,535 A | * | 5/1956 | Curry | 269/34 |
| 3,056,625 A | * | 10/1962 | Timmerman | 294/106 |
| 3,069,943 A | * | 12/1962 | Fischer | 81/9.42 |
| 4,261,090 A | * | 4/1981 | De Boer | 29/252 |
| 4,392,563 A | * | 7/1983 | Holman | 193/10 |
| 4,509,298 A | * | 4/1985 | Klievoneit | 451/398 |
| 4,834,232 A | * | 5/1989 | Freermann | 198/468.2 |
| 6,386,532 B1 | * | 5/2002 | Donovan et al. | 269/25 |

* cited by examiner

*Primary Examiner*—David L Sorkin
(74) *Attorney, Agent, or Firm*—Kevin W. Cyr; Cye & Associates, P.A.

(57) ABSTRACT

Apparatus and methods for locking a discharge chute of a mixing vehicle are disclosed. The locking apparatus can be mounted to existing discharge chutes and frame arrangements and may utilize existing pneumatic systems of the mixing vehicle. The locking apparatus generally include a base having a first arm and a second arm pivotally secured to the base. An airbag may be positioned between the first arm and the second arm to bias a clamping region of the locking apparatus in a locked or a released state depending on the configuration of the locking apparatus.

2 Claims, 9 Drawing Sheets

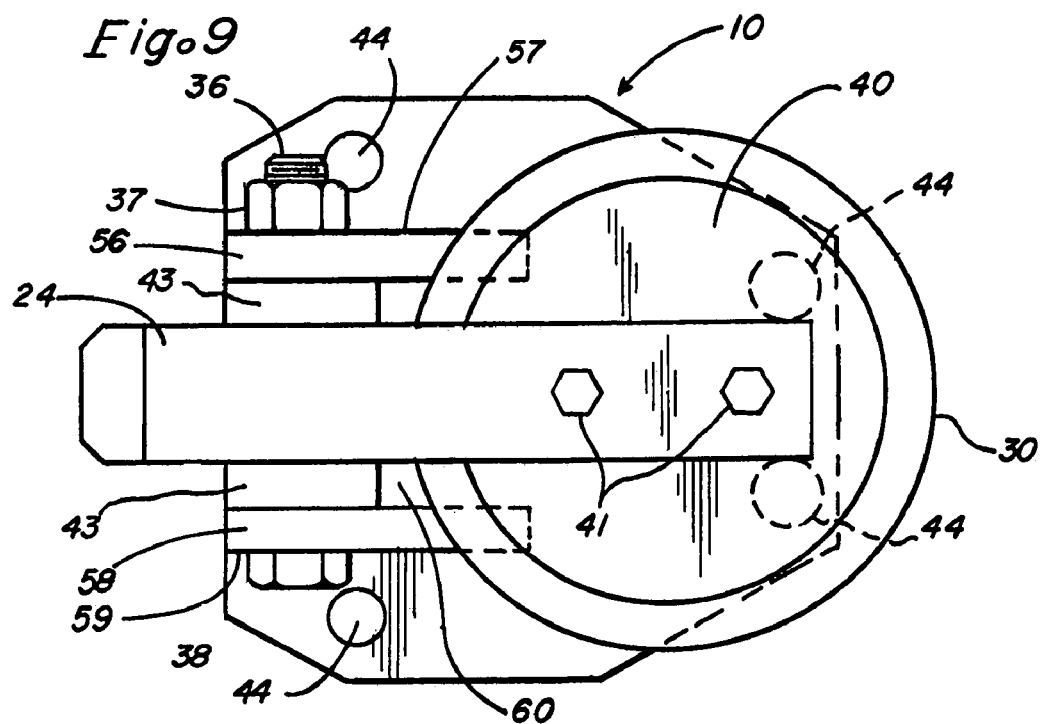
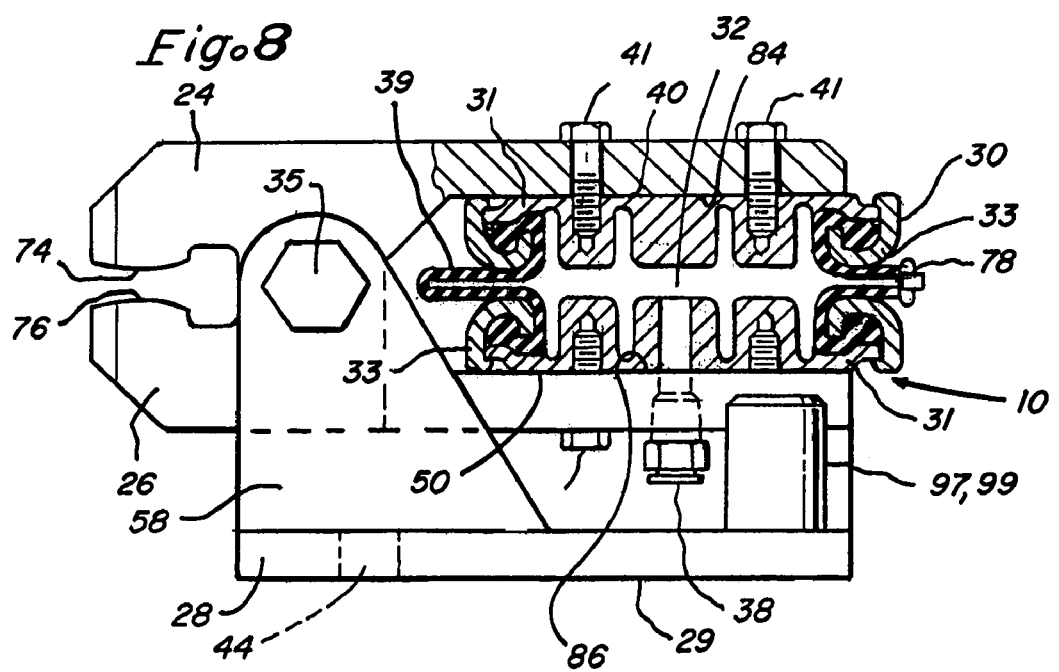

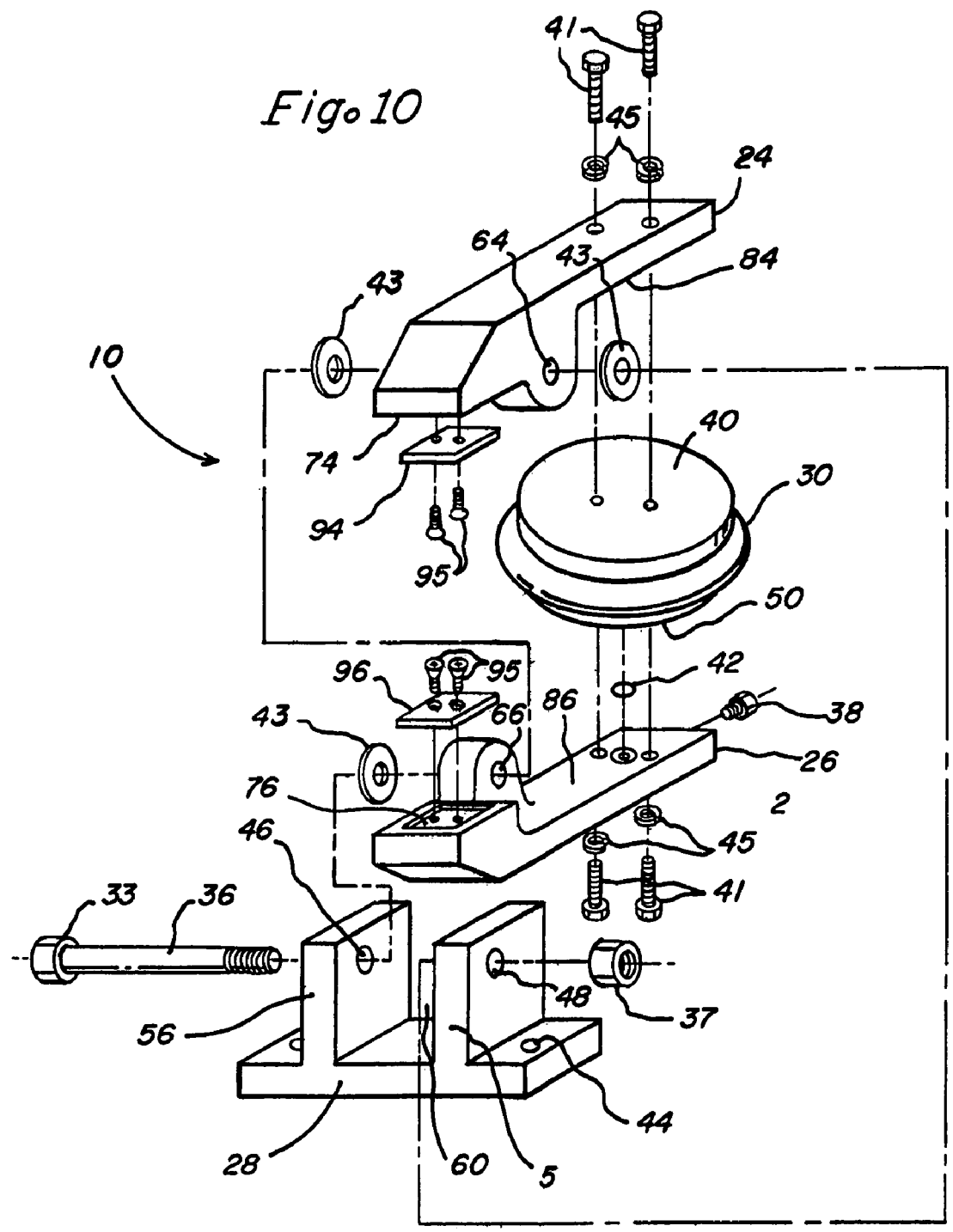

APPARATUS AND METHODS FOR SECURING DISCHARGE CHUTES ON MIXING VEHICLES

BACKGROUND OF THE INVENTION

1. Summary of the Invention

The present invention relates to discharge chutes on mixing vehicles and, more particularly, to apparatus and methods securing a discharge chute at a desired position about its range of motion.

2. Description of the Related Art

Vehicles designed to mix and transport concrete typically include mixing drums in which the liquid concrete is held during transportation. The mixing drums normally have a capacity of between seven and ten cubic yards of concrete. This volume of concrete typically weighs between 28,000 lbs and 40,000 lbs. The mixing drums typically rotate on the mixing vehicle to agitate the mass of liquid concrete and to prevent it from setting during transport.

The mixing drums are typically set at an angle on the mixing vehicle which places the discharge opening of the mixing drum above the level of a full load of concrete. When the concrete is to be discharged, rotation of the drum is typically reversed which directs the liquid concrete outwardly through a discharge opening. This discharge opening is typically positioned at the front or rear of the vehicle. The discharged concrete is received and guided to the desired location by a pivoting discharge chute. The discharge chute is typically mounted below the discharge opening. The discharge chute is typically configured to pivotally rotate about a vertical axis on the vehicle. Accordingly, the chute may direct concrete to either side or to the front/rear of the mixing vehicle depending upon the particular configuration of the vehicle. Extensions of the chute may be employed to direct concrete to locations more remote from the vehicle.

At 4,000 pounds per cubic yard, the liquid concrete can produce substantial forces as it is directed by and moves along the discharge chute. When disposed along a long extension, the dynamic mass of concrete can produce significant torque at the connection of the discharge chute to the vehicle. Given the pivoting nature of a typical discharge chute, the forces on the discharge chute can produce movement which is difficult to manually control and may result in unwanted movement of the discharge chute. This movement of the discharge chute can result in the misdirection of the liquid concrete which wastes both the concrete and the man-hours needed for cleanup. In addition, a freely swinging chute can present a significant safety hazard for those working around the discharge chute. Accordingly, various devices and alternative configurations have been employed for controlling and/or locking discharge chutes in a desired position.

Some prior devices for securing the position of a chute include manual operable clamp assemblies mounted to a pivoted chute brace. These clamp assemblies typically consist of a threaded shaft at one end of an upright brace bearing shaft. A wheel is typically threadably engaged to a shaft and can be selectively tightened against the shaft journal to clamp a brace tightly to a vehicle 100 frame. This brace-type brake is partially serviceable for standard length chutes. However, the locking mechanism can vibrate loose and allow the chute to pivot freely.

U.S. Pat. No. 3,279,766 to F. V. Mendoza discloses a transit concrete mixer with particular reference to a brake mechanism. The mechanism disclosed enables selective angular positioning of a concrete chute. The brake components used are of typical automotive drum brake design with axially oriented shoes and brake surfaces. A hydraulic brake cylinder is utilized for actuation of the brake shoes selectively bringing them radially against a brake drum.

The problem of braking a discharge chute at the pivotal mount for the discharge chute is also recognized to a limited degree in the U.S. Patent to Hansen et al, U.S. Pat. No. 3,334,872. Hansen et al discloses a double ended piston hydraulic cylinder that controls pivotal movement of a discharge chute at the chute's mounting point on the concrete mixing truck. The cylinder operates to pivot the discharge chute about its axis and also acts as a positive brake.

The hydraulic cylinder requires use of an expensive and complex hydraulic system that is not typically supplied as standard equipment on concrete mixing trucks. Hydraulic cylinders wear quickly when exposed to concrete with its naturally abrasive component. Maintenance and repair therefore become frequent. Furthermore, use of a hydraulic cylinder could be considered "overkill", since the primary need is not for powered movement of the chute. The discharge chute is usually empty when moved from one position to another. The primary need is for holding the discharge chute stationary after being angularly positioned, when it is full of heavy concrete.

U.S. Pat. No. 3,410,538 to M. L. Potter discloses a positive locking apparatus for positioning a discharge chute at any of several pre-selected angular positions. Potter's arrangement uses a positive detent type lock between the chute frame and a pressure plate pivoted with the chute. A pin is used to interconnect the stationary frame with the pivoted pressure plate by insertion within one of several angularly spaced apertures provided in the movable pressure plate.

The Potter device and other known "detent" type chute locking mechanisms do allow positive positioning of the discharge chute at the pivot point between the discharge chute and stationary frame but do not enable infinite angular adjustment for precise pouring. Further, such mechanisms will not effectively operate to stop a moving discharge chute without causing possible damage to the lockout mechanism. Difficulty is also experienced in removing and placing the lock pin when the discharge chute is loaded.

SUMMARY OF THE INVENTION

This Summary capsulizes some of the claimed aspects of the present invention.

Additional details of aspects of the present invention and/or additional embodiments of the present invention are found in the Detailed Description of the Invention. Further, an Abstract of the specification's technical disclosure is included for purposes of complying with 37 C.F.R. 1.72. The Abstract is not intended for use in interpreting the scope of the claims.

The present invention includes a locking that can be mounted to existing chute and frame arrangements and that makes use of the existing pneumatic systems typically available for air brakes or air suspension on the mixing vehicle. The locking apparatus can be controlled to stop the chute at any selected angular position and hold it securely in place until actuated or deactuated depending upon the particular configuration of the apparatus. An apparatus for securing a discharge chute of a mixing vehicle can include a base, a first arm, a second arm, and an airbag. The base is generally configured to be mounted to the mixing vehicle. The first arm can define a first clamping portion and a first air bag receiving portion. The first clamping portion is generally configured to contact a first side of a pressure plate. The first arm can be pivotally secured to the base between the first clamping portion and the first airbag receiving portion. The second arm can define a second clamping portion and a second airbag receiving portion. The second clamping portion is generally configured to contact a second side of a pressure plate. The second arm can also be pivotally secured to the base between the first clamping portion and the second clamping portion. The airbag is generally secured at a first end of the airbag to the first airbag receiving portion of the first arm and secured at a second end of the airbag to the second airbag receiving portion of the second arm. The airbag is generally configured to bias the first airbag receiving portion of the first arm and the second airbag receiving portion of the second arm apart upon inflation. The locking apparatus may further include a resilient member secured between the first arm and the second arm proximate to the first airbag receiving portion and the second airbag receiving portion. The resilient member may function to bias the first clamping portion against a first surface of a pressure plate and the second clamping portion against a second surface of the pressure plate.

BRIEF DESCRIPTION OF THE FIGURES

FIG. 8 illustrates a side view of another exemplary embodiment of the present invention;

FIG. 9 illustrates a top view of an exemplary embodiment of the present invention similar to the embodiment illustrated in FIG. 8; and FIG. 10 illustrates an exploded perspective view of an exemplary embodiment of the present invention similar to the embodiment illustrated in FIG. 7.

Figure 1:
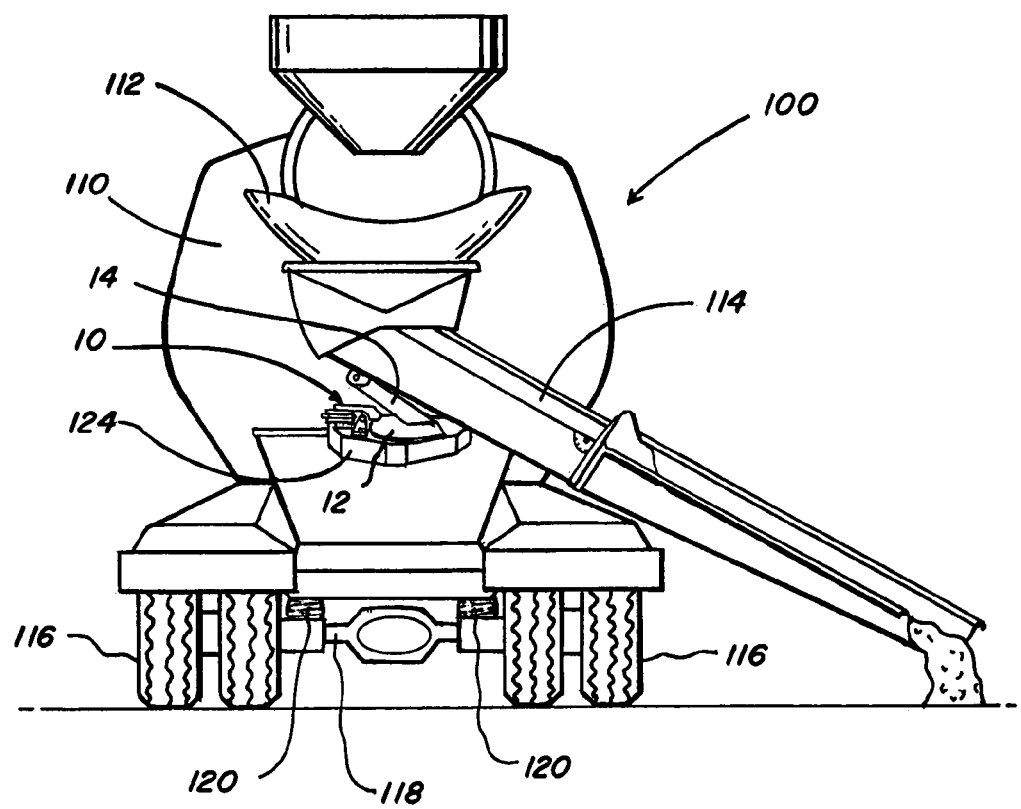
FIG. 1 illustrates an end view of an exemplary embodiment of the present invention secured to the rear end of a concrete mixing vehicle.

All Figures are illustrated for ease of explanation of the basic teachings of the present invention only; the extensions of the Figures with respect to number, position, relationship and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in various Figures of the drawings, the same numerals designate the same or similar parts. Furthermore, if used in the description without further elaboration, the terms "top," "bottom," "right," "left," "forward," "rear," "first," "second," "inside," "outside," and similar terms should be understood to reference only the structure shown in the drawings as it would appear to a person viewing the drawings and utilized only to facilitate describing the illustrated embodiment.

DETAILED DESCRIPTION OF THE INVENTION

The present invention is intended for use on mixing vehicles 100. These vehicles 100 are frequently configured and utilized for mixing concrete. For exemplary purposes and ease of description, the following description describes the invention in association with a concrete mixing truck as the vehicle 100. Vehicles 100 typically include a mixing drum 110 rotatably mounted to the vehicle 100. The drum 110 includes a discharge opening. The discharge opening typically faces frontward or rearward with respect to the front and rear of the vehicle 100. A hopper 112 is typically positioned adjacent to the discharge opening. A discharge chute 114 is typically positioned below the hopper 112 for receiving the concrete discharged from the discharge opening. The discharge chute 114 is typically mounted to the vehicle 100 to pivot about a vertical axis. The discharge chute 114 is also typically extendable to one or more elongated positions. Accordingly, the discharge chute 114 may direct concrete to a desired position remote from drum 110.

Figure 2:
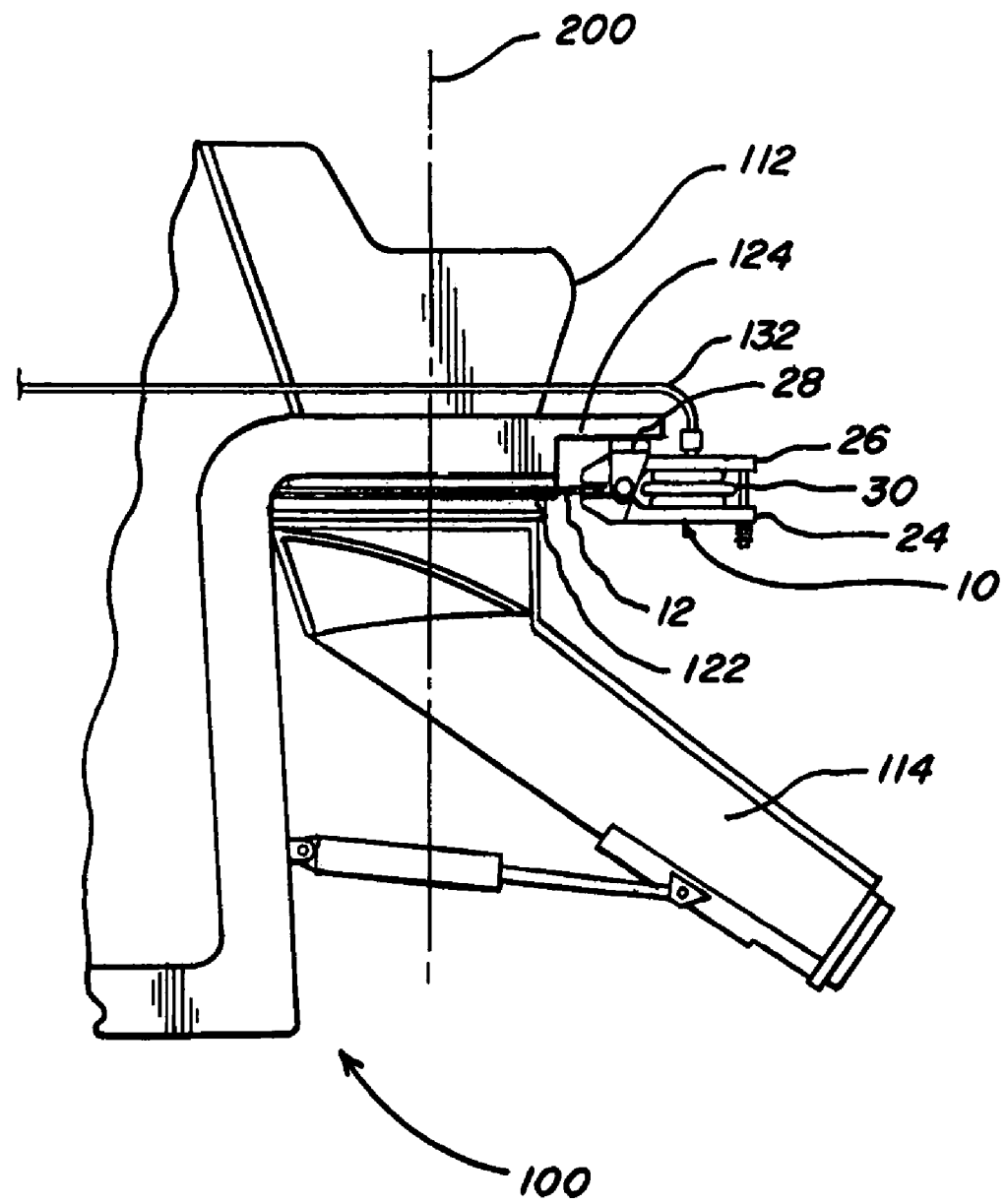
FIG. 2 illustrates a partial side view of another exemplary embodiment of the present invention secured to a concrete mixing vehicle.

FIGS. 1 and 2 illustrate a couple of exemplary configurations for vehicles 100 and locking apparatus 10 in which the present inventions may be utilized. As illustrated, vehicle 100 is a rear discharge transit mixer. The vehicle 100 is depicted discharging concrete to one side of the vehicle 100 using a chute 114 having a semicircular configuration. The semicircular shape of discharge chute 114 in part permits the discharge chute 114 to contain and guide the concrete as it is directed to a target location. The vehicle 100 is supported by wheels 116 connected by an axle assembly 118 mounted to the frame of the vehicle 100 through an air suspension system 120. In addition, vehicles 100 may also include air braking systems.

A locking apparatus 10 in accordance with the present invention is secured to the rear of vehicle 100, for exemplary purposes. The locking apparatus 10 is selectively operable to lock the discharge chute 114 at a selected angular position about the vertical axis 200. Vertical axis 200 is generally defined relative to vehicle 100 and is used for descriptive purposes only. Locking apparatus 10 is generally configured to grip pressure plate 12 which is connected to discharge chute 114. The pressure plate 12 and discharge chute 114 are connected such that the pressure plate 12 rotates with the discharge chute 114 as the discharge chute is pivoted about its vertical axis of rotation. In certain embodiments, pressure plate 12 may also be rotatably secured to the vehicle 100. In operation, when locking apparatus 10 is secured to pressure plate 12, the discharge chute 114 is secured in a position for rotation around the vertical axis 200. When locking apparatus 10 is released from the pressure plate, the discharge chute 114 may be rotated around the vertical axis 200. As generally illustrated for exemplary purposes, pressure plate 12 and discharge chute 114 are configured to rotate in planes substantially perpendicular to vertical axis 200.

The connection of pressure plate 12 and discharge chute 114 may be direct or remote. In some remote variations, pressure plate 12 may be connected to discharge chute 114 by arms, pressure plates, shafts, gears or otherwise as will be recognized by those skilled in the art. Thus, in certain embodiments, pressure plate 12 may be configured to rotate in a plane distinct from that of the discharge chute 114. FIG. 1 illustrates a pressure plate 12 remotely secured to discharge chute 114 by an arm 14 for exemplary purposes. FIG. 2 illustrates a pressure plate 12 secured directly to a discharge chute 114. Locking apparatus 10 may be connected to air suspension system 120 and/or air brake system to receive compressed air to lock or unlock locking apparatus 10 from pressure plate 12.

FIG. 2 illustrates a partial view of another embodiment vehicle 100. As illustrated, pressure plate 12 is secured directly to discharge chute 114. As illustrated, the discharge chute 114 rotatably secured to vehicle 100 by a ring bearing 122 for exemplary purposes. The illustrated pressure plate 12 is oriented on the discharge chute 114 such that the discharge chute 114 and the pressure plate 12 rotate about the same vertical axis 200. In one aspect, the discharge chute 114 may be secured to an arm or platform 124 secured to the vehicle 100. The discharge chute 114 is positioned below the hopper 112. As illustrated, locking apparatus 10 is secured to the arm/platform 124 to position portions of the locking apparatus 10 operably about pressure plate 12.

Figure 3:
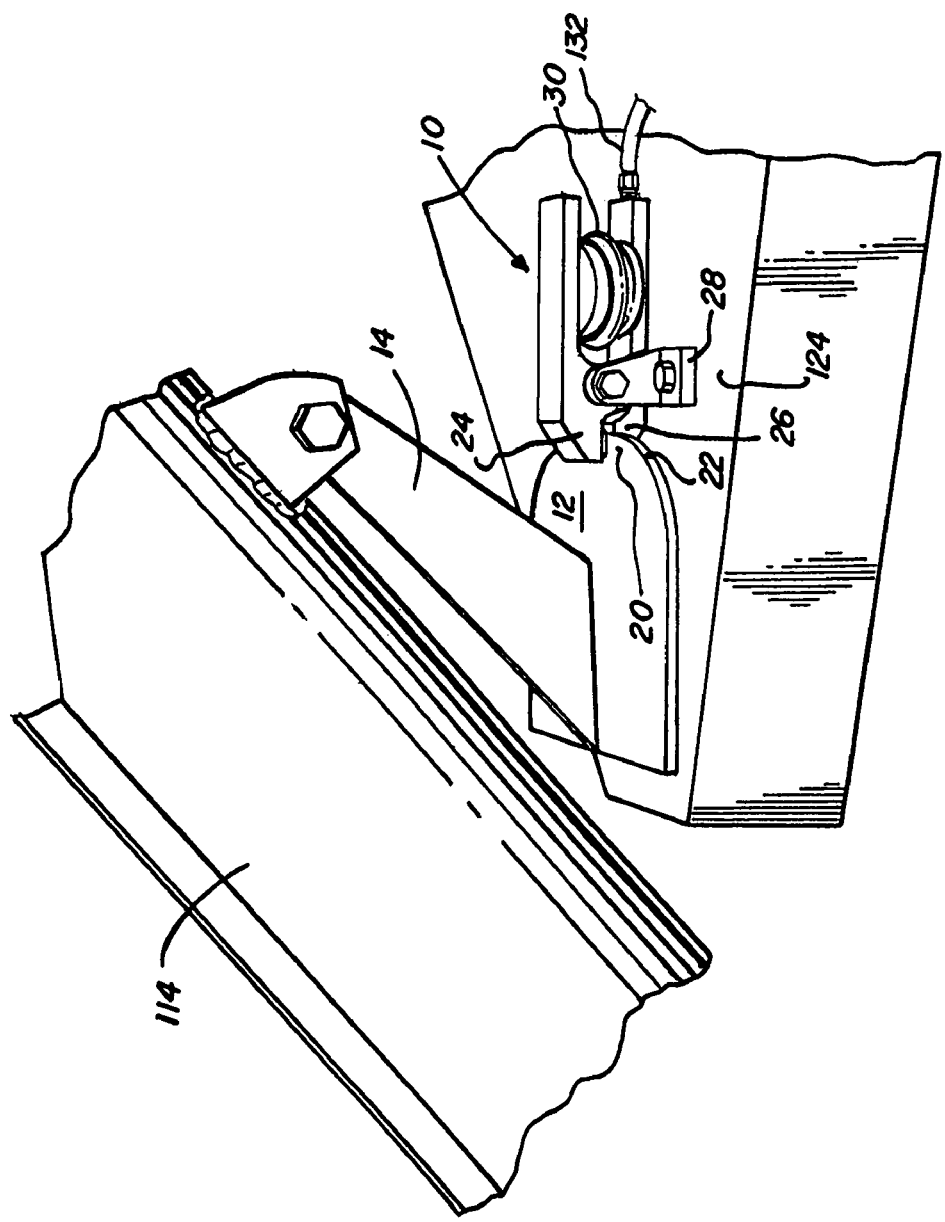
FIG. 3 illustrates a partial side view of another exemplary embodiment of the present invention secured to a concrete mixing vehicle.

FIG. 3 illustrates a more detailed partial view of an embodiment of the present invention similar to that illustrated in FIG. 1 secured to a vehicle 100. As illustrated, discharge chute 114 includes an arm 14 connecting discharge chute 114 to pressure plate 12. Pressure plate 12 is rotatably secured to a platform 124. Locking apparatus 10 is also secured to platform 124 and is positioned adjacent to substantially planar rim 20 of pressure plate 12. Rim 20 includes an arcuate edge 22. For exemplary purposes, the entire pressure plate 12 has been illustrated as planar. However, those skilled in the art will recognize that only a rim 20 of the pressure plate can be planar to facilitate interaction with certain embodiments of locking apparatus 10. As illustrated, locking apparatus 10 includes a first arm 24 and a second arm 26 pivotally connected to a base 28. In certain embodiments, the shape of arcuate edge 22 of pressure plate 12 permits a portion of the rim 20 of pressure plate 12 to remain positioned between first arm 24 and second arm 26 of locking apparatus 10 for the full range of motion of discharge chute 114 about the vertical axis 200. In other embodiments, the shape of arcuate edge 22 of pressure plate 12 permits a portion of the rim 20 of pressure plate 12 to remain positioned between first arm 24 and second arm 26 of locking apparatus 10 for the partial range of motion of discharge chute 114 about the vertical axis 200. In one aspect, the arcuate edge 22 may define a portion of a circle. The center of the circle may be positioned at the point of rotation of plate 12 about the vertical axis 200. Apparatus 10 further includes an airbag 30 positioned between first arm 24 and second arm 26. Depending on the particular configuration of locking apparatus 10, the inflation of airbag 30 may either release or secure locking apparatus 10 to the pressure plate 12. For inflation, airbag 30 is in communication with a source of compressed air. In one aspect, an air hose 132 in communication with a source of compressed air may communicate the compressed air from its source to the airbag 30. The source of compressed air may be a compressor, an air tank, or other source for compressed air as will be recognized by those skilled in the art. As mentioned above, one exemplary source of compressed air may the communicated from the air brake or air suspension systems 120 of the vehicle 100. A system of controllable valves may also be provided to permit the inflation and deflation of the airbag by an operator dependent and/or independent of the function of the source of compressed air.

FIGS. 4 to 10 illustrate embodiments of locking apparatus 10 in accordance with the present invention. These embodiments of locking apparatus 10 generally include a base 28, a first arm 24, a second arm 26, and an airbag 30. The embodiments of FIGS. 4 to 6 further include a resilient member 34.

Figure 4:
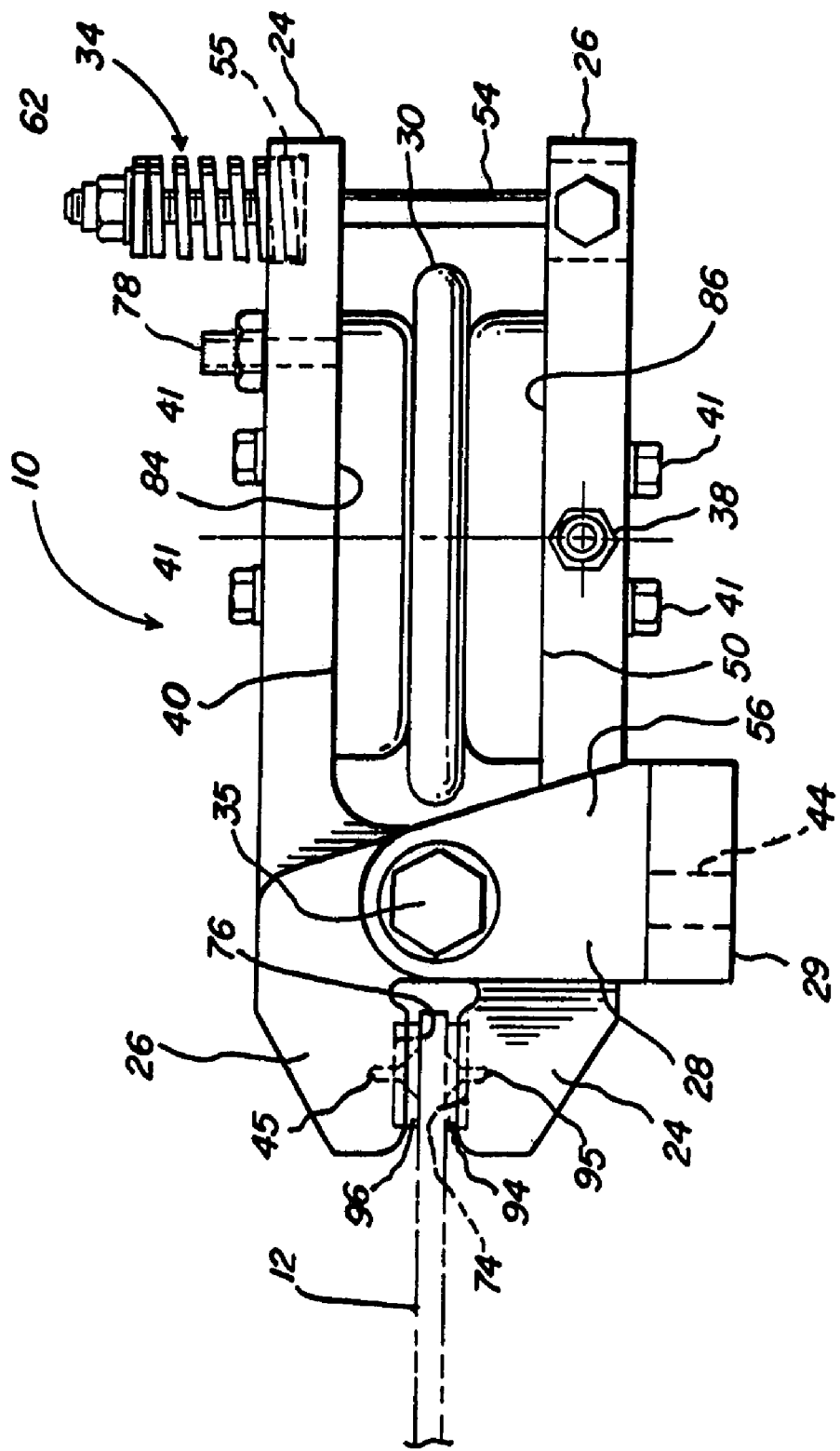
FIG. 4 illustrates a side view of an exemplary embodiment of the present invention.
Figure 5:
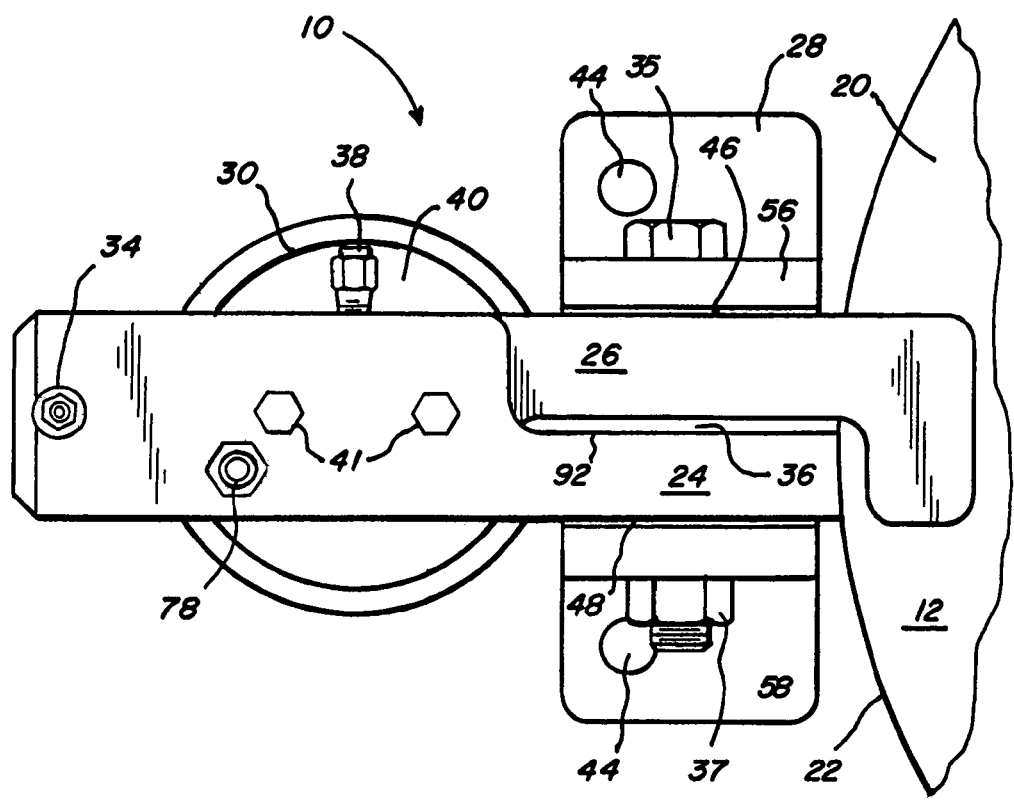
FIG. 5 illustrates a top view of an exemplary embodiment of the present invention similar to the embodiment illustrated in FIG. 4.
Figure 6:
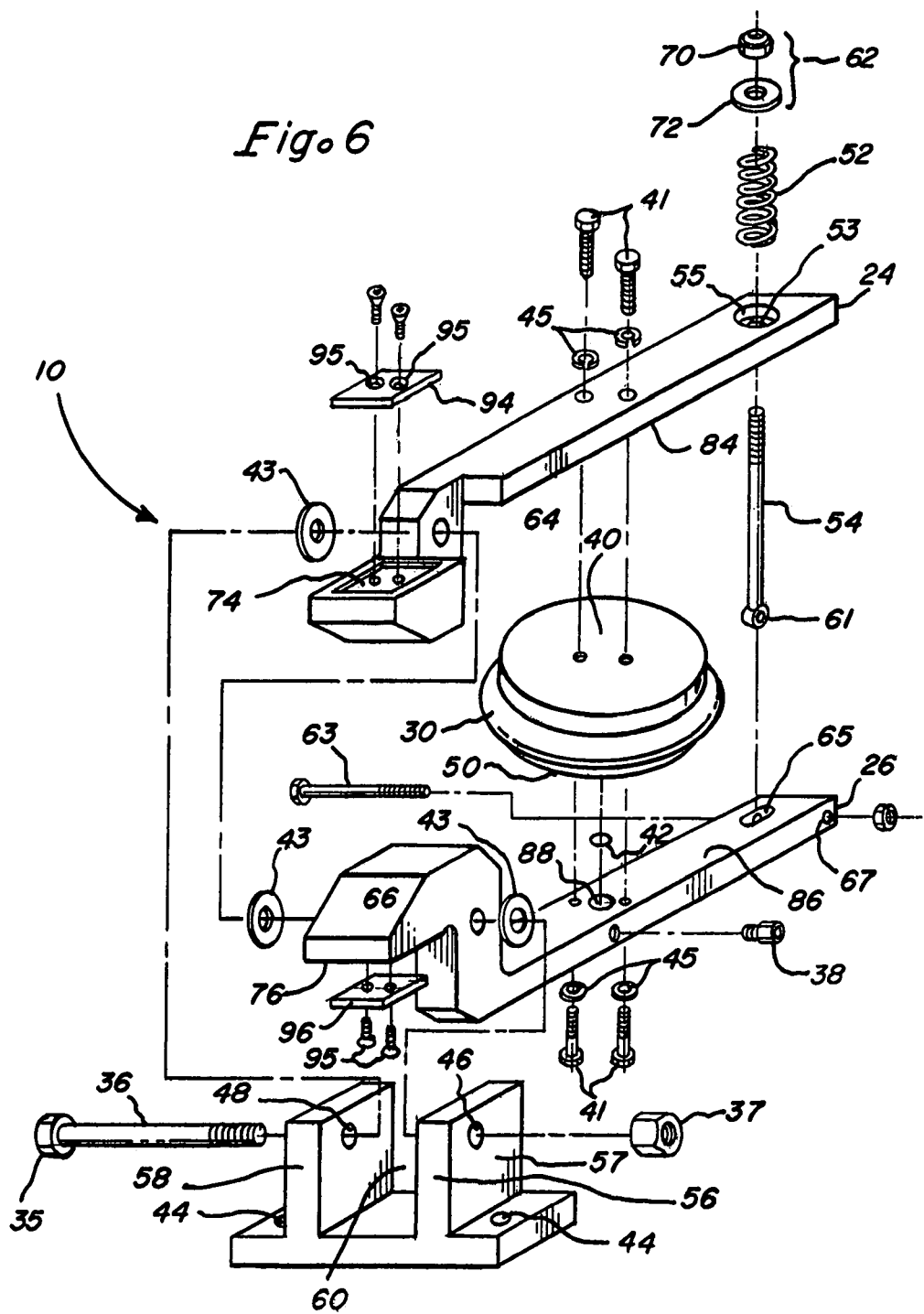
FIG. 6 illustrates an exploded perspective view of an exemplary embodiment of the present invention similar to the embodiment illustrated in FIG. 4.
Figure 7:
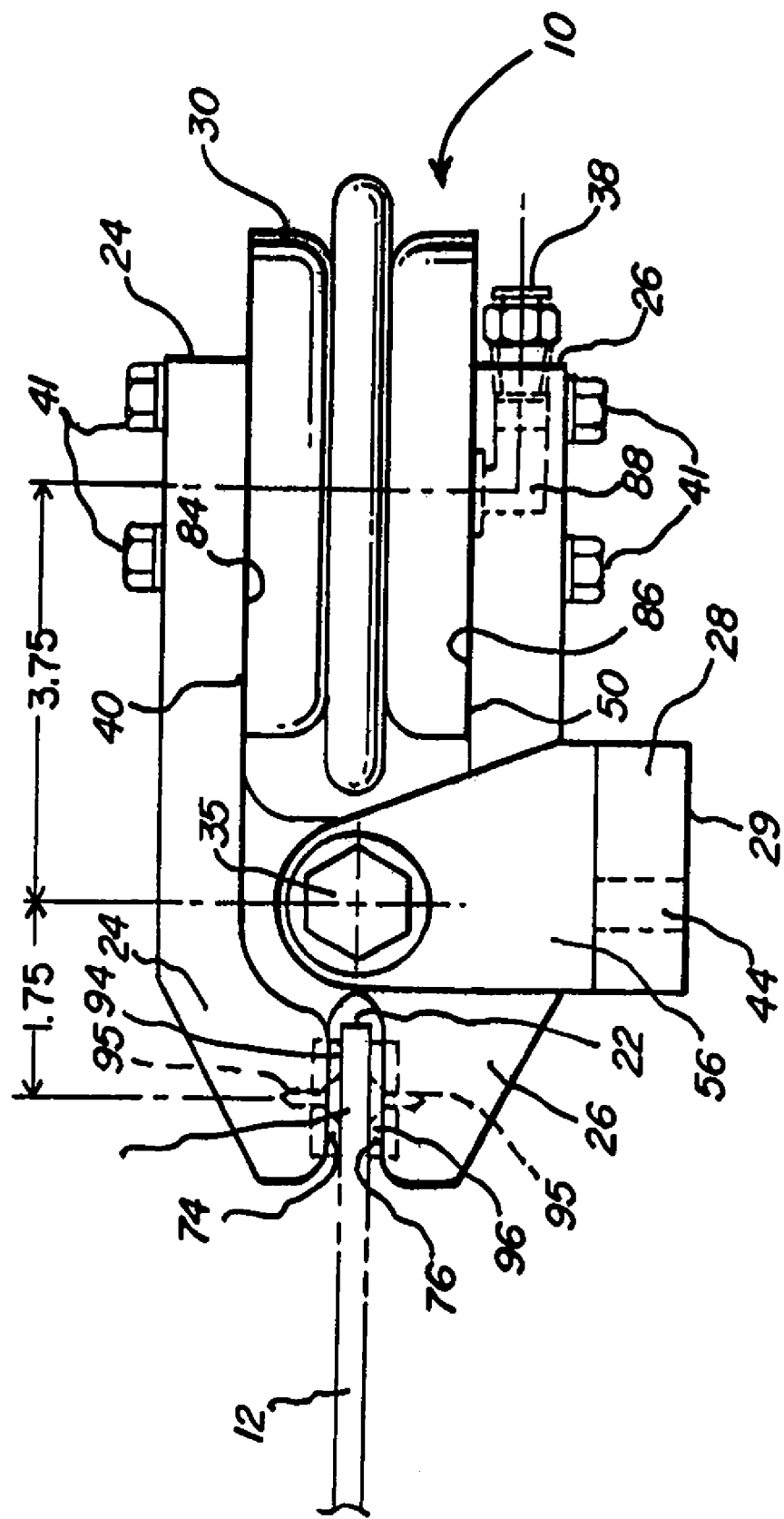
FIG. 7 illustrates a side view of another exemplary embodiment of the present invention.

The locking apparatus 10 is generally configured to exert a gripping force to a rim 20 of pressure plate 12 between the clamping portions 74, 76 of the first arm 24 and the second arm 26 to securely hold the pressure plate 12 in a desired position. As illustrated in FIGS. 4 to 6, apparatus 10 releases from pressure plate 12 when the airbag 30 is pressurized sufficiently to overcome the locking force exerted by resilient member 34. As illustrated in FIGS. 7 to 10, apparatus 10 grips the pressure plate 12 when the airbag 30 is pressurized.

Base 28 is configured to secure locking apparatus 10 to vehicle 100 and to withstand the forces typically conferred upon locking apparatus 10 to maintain the position of discharge chute 114 during operation of mixing vehicle 100. As illustrated for exemplary purposes, base 28 may define a flat lower surface 29 to be received on a surface of a vehicle 100 or may be otherwise configured as will be understood by those skilled in the art upon review of the present disclosure. To secure locking apparatus 10 to vehicle 100, base 28 may define mounting holes 44 for mounting the base 28 to vehicle 100. Base 28 may be particularly configured to pivotally secure first arm 24 and second arm 26. Typically, first arm 24 and second arm 26 will movably attached to base 28 to pivot about one or more axes. As illustrated, first arm 24 and second arm 26 are secured to base 28 by a shaft 36. Base 28 may define a first passage 46 and a second passage 48 concentrically positioned about the intended axis of rotation the first arm 24 and second arm 26. Shaft 36 may extend through first passage 46 and second passage 48 defined by base 28 to pivotally secure the first arm 24 and the second arm 26 to base 28. The first passage 46 may be defined on a first extension 56 and second passage 48 may be defined on a second extension 58 extending from base 28. In one aspect, first extension 56 and second extension 58 may function to position the first arm 24 and the second arm 26 relative to arcuate edge 22 of pressure plate 12. First extension 56 and second extension 58 may define an intermediate cavity 60 between the extensions 56, 58 to receive portions of first arm 24 and second arm 26. First extension 56 and second extension 58 may be secured to or integral with base 28. In other aspects, distinct pivot points may be provided for both the first arm 24 and second arm 26 in accordance with the present invention by having a first shaft to which the first arm 24 is mounted and a second shaft to which the second arm 26 is mounted. Those skilled in the art will recognize additional configurations for pivotally mounting first arm 24 and second arm 26 upon review of the present disclosure that are intended to remain within the scope of the present invention. As illustrated, shaft 36 is configured as a bolt for exemplary purposes. Alternatively, the shaft 36 may be integrally formed as part of one of the arms 24, 26 or extensions 56, 58 or may take any number of other forms as will be recognized by those skilled in the art upon review of the present disclosure. The head 33 of the illustrated shaft 36 may abut an outer surface 57 of first extension 56 and the nut 37 may abut a surface 59 of second extension 58 to secure the bolt in the first passage and the second passage between the first extension 56 and second extension 58. Upon review of the present disclosure, those skilled in the art will recognize other pivoting linkages that may be utilized to secure the first arm 24 and second arm 26 to base 28 which do not depart from the scope of the present invention.

First arm 24 and second arm 26 are elongated members having a first end and a second end. The first ends and the second ends are positioned at opposite ends of the first arm 24 and the second arm 26. The first ends include a first clamping portion 74 and a second clamping portion 76 on the first arm 24 and second arm 26, respectively, for engaging the pressure plate 12. The second ends include a first airbag receiving portion 84 and a second airbag receiving portion 86 on the first arm 24 and second arm 26, respectively. Each of the first airbag receiving portion 84 and second airbag receiving portion 86 are configured to engage airbag 30 to increase the distance between first airbag receiving portion 84 and second airbag receiving portion 86 upon inflation of airbag 30. The first arm 24 and the second arm 26 are pivotally secured to base 28. As illustrated, first arm 24 includes a first mounting passage 64 configured to receive a shaft 36 and second arm 26 includes a second mounting passage 66 to receive a shaft 36. When shaft 36 is secured to base 28 as illustrated in FIGS. 4 and 10, first arm 24 and second arm 26 having received the shaft 36 through the first mounting passage 64 and second mounting passage 66 may also be pivotally secured to base 28. Any number of washers or spacers 43 may be positioned over shaft 36 as is dictated by the particular configurations of various components. The first mounting passage 64 and the second mounting passage 66 are positioned between the respective clamping portions 74, 76 and airbag receiving portions 84, 86 of first arm 24 and second arm 26. The first clamping portion 74 and the second clamping portion 76 may include a first pad 94 and a second pad 96, respectively. In one aspect, the first pad 94 and the second pad 96 may be designed to optimize the friction generated by contact between the first clamping portion 74 and the second clamping portion 76 and the pressure plate 12 and, accordingly, represent friction pads. Pads 94, 95 may be secured to their respective gripping regions 74, 76 by screws 95 or may be otherwise secured to their respective gripping regions 74, 76. In another aspect, the first pad 94 and the second pad 96 may be designed to reduce wear and tear on their respective clamping portions and, accordingly, represent wear pads. In yet another aspect, the first pad 94 and the second pad 96 may be designed to dampen vibration or movement of the pressure plate 12 and, accordingly, represent damping pads. The pads 94, 96 may be formed from a variety of rubbers, synthetic polymers, metals and other materials and combinations of materials that will be recognized by those skilled in the art. The second arm 24 may include a brace 97 which may be received within a brace cavity 99 to further stabilize at least the second arm 26 when subject to forces conferred from securing discharge chute 114. Brace 97 will typically be secured to the vehicle 100 directly or to the base 28.

Airbag 30 defines an expansion chamber 32 and includes a first end 40 and a second end 50. Airbag 30 may be made as a unitary inflatable sack or may be made in a variety of configurations such as the exemplary plates 31, mounting rings 33, and membrane 39 illustrated in FIG. 8. Airbag 30 is secured between the first airbag receiving portion 84 of the first arm 24 and the second airbag receiving portion 86 of the second arm 26. As illustrated, airbag 30 may be secured to the first airbag receiving portion 84 and the second airbag receiving portion 86 by bolts 41. Bolts 41 may include lock washers 45 to further secure bolts 41 to arms 24, 26 and/or airbag 30. As will be understood in the art, airbag 30 may be configured to otherwise be mechanically secured to airbag receiving portions 84, 86, may be adhesively secured, or may be otherwise secured to the airbag receiving portions 84, 86. An air port 38 is in fluid communication with the expansion chamber 32 defined by the airbag 30. The air port 38 may be integral with an arm 24, 26 or may be a independent component secured to an arm 24, 26 or directly to airbag 30. The air port 38 may communicate with the air chamber 32 through an air passage 88 defined in one of arms 24, 26. A gasket 42 may be provided between the opening to air passage 88 and the airbag 30. The air port 38 functions to at least allow the introduction of air into the expansion chamber 32 from a source of compressed air. Typically, the air port 38 is in fluid communication with an air hose 132 to communicate air from the source of compressed air to the expansion chamber 32. In one aspect, the airbag 30 is generally configured to increase the distance and/or produce an expanding force between the first end 40 and second end 50 of the airbag 30 upon addition of air into the expansion chamber 32. A pressure relief valve 78 may also be fluid communication with expansion chamber 32. Pressure relief valve 78 may be provided to allow a user to release pressure from the expansion chamber 32 and/or may provide for release of pressure when the pressure within the expansion chamber 32 exceeds a set threshold.

The embodiments of FIGS. 4 to 6 include portions of the first arm 24 and second arm 26 that cross within an intersection point or region 92 between the respective clamping portions and airbag receiving portions. In the exemplary illustrated embodiments, intersection 92 is generally positioned at or about the pivot point for the arms 24, 26 for exemplary purposes. In other words ascribing upper and lower terminology relative to the base 28 for descriptive purposes, the first arm 24 includes the first upper airbag receiving portion 84 and the first lower clamping portion 74 and the second arm 26 includes the second lower airbag receiving portion 86 the second upper clamping portion 76. In operation, the distance between the first clamping portion 74 and the second clamping portion 76 increases as the distance between the first mounting portion 84 and second mounting portion 86 increases. To secure the pressure plate 12 between the first clamping portion 74 and the second clamping portion 76, the resilient member 34 is provided between the first arm 24 and the second arm 26. The resilient member 34 biases the first clamping portion 74 toward the second clamping portion 76. The resilient member 34 may be provided on the same side of the pivot point as the first airbag receiving portion 84 and the second airbag receiving portion 86. Typically, the resilient member 34 will be provided at a sufficient distance from the pivot point to permit the resilient member 34 to exert sufficient force to lock pressure plate 12 and associated discharge chute 114 at a desired position. In this embodiment, inflation of airbag 30 releases the clamping force between the first clamping portion 74 and the second clamping portion 76 as the compressive force of the resilient member 34 is overcome.

As illustrated in FIGS. 4 to 6 for exemplary purposes, resilient member 34 includes a spring 52 disposed over a spring shaft 54 slidably passing through a shaft passage 53 in second arm 26. A first end of the spring shaft 54 is secured to the second end of the first arm 24. As illustrated, the first end of the spring shaft 54 is pivotally secured to the second end of second arm 26. For exemplary purposes, spring shaft 54 is secured by an eyelet shaft 63 secured to second arm 26 and positioned through an eyelet 61 an end of spring shaft 54. The eyelet shaft 63 may be positioned within a retention lumen 67 defined by the end of second arm 26. Further, the eyelet 61 may be secured within a retention cavity 65 also defined by the end of second arm 26 and intersecting with retention lumen 67. The second end of the spring shaft 54 includes a detent 62 configured to retain the spring 52 on the spring shaft 54. The detent 62 is illustrated for exemplary purposed as a circular stop 72 secured over the end of spring shaft 54 by a threaded cap 70 secured to the end of the spring shaft 54. The spring 52 is positioned between an upper surface of the second arm 26 and the detent 62. As illustrated, the spring 52 is biased between the upper surface of the second arm 26 within a spring cavity 53 defined in the top surface of first arm 24. As such, the first clamping portion 74 of the first arm 24 and the second clamping portion 76 of the second arm 26 are biased toward one another as the spring 52 tends to force the first airbag receiving portion 84 of the first arm 24 toward and second airbag receiving portion 86 of the second arm 26. In such a configuration, the spring 52 is typically selected to have a spring constant sufficient to maintain the pressure plate 12 in a desired position during operation of vehicle 100. In other embodiments, the resilient member may be an elastic material, springs or other resilient material operatively connected between the locking apparatus 10 to bias the first airbag receiving portion 84 toward the second airbag receiving portion 86. To release the first clamping portion 74 and second clamping portion 76 from the pressure plate 12, compressed air is provided into the expansion chamber 32 through air port 38. The pressure within the expansion chamber 32 is increased at least until the clamping force exerted by the spring 52 is sufficiently overcome to permit the desired freedom of movement of the discharge chute 114.

The embodiments of first arm 24 and second arm 26 illustrated in FIGS. 7 to 10 do not cross as do the embodiments of FIGS. 4 and 6. In other words, again ascribing upper and lower terminology relative to the base 28 for descriptive purposes, the first arm 24 includes the first upper airbag receiving portion 84 and the first upper clamping portion 74 and the second arm 26 includes the second lower airbag receiving portion 86 the second lower clamping portion 76. In operation of this embodiment, the distance between the first clamping portion 74 and the second clamping portion 76 decreases as the distance between the first mounting portion 84 and second mounting portion 86 increases. Accordingly, inflation of airbag 30 provides the clamping force between the first clamping portion 74 and the second clamping portion 76. To release the first clamping portion 74 and second clamping portions 76 from the pressure plate 12, compressed air may be released from the expansion chamber 32. Typically, the air is released through pressure relief valve 78 or through air port 38. The pressure within the expansion chamber 32 is decreased at least until the clamping force exerted by the airbag 30 is sufficiently reduced to permit the desired freedom of movement of the discharge chute 114.

Although illustrated and described herein with reference to certain specific embodiments, the present invention is nevertheless not intended to be limited to the details provided in the foregoing description. Rather, various modifications may be made in the details within the scope and range of equivalents of the claims and without departing from the spirit of the invention. These modifications may become apparent to those skilled in the art upon review of the present disclosure.

What is claimed is:

1. A mixing vehicle, comprising:
   a frame;
   a discharge chute pivotally mounted relative to the frame to direct material discharged from the mixing vehicle;
   a pressure plate secured to move relative to a pivoting movement of the discharge chute; and
   a locking apparatus to secure the discharge chute at a desired position relative to the frame of the mixing vehicle, comprising:
      a base configured to be mounted to the frame;
      a first arm having a first clamping portion and a first air bag receiving portion, the first arm pivotally secured to the base between the first clamping portion and the first airbag receiving portion, the first clamping portion configured to contact the a first side of the pressure plate;
      a second arm having a second clamping portion and a second airbag receiving portion, the second arm pivotally secured to the base between the first clamping portion and the second clamping portion, the second clamping portion configured to contact a second side of a pressure plate; and
      an airbag secured at a first end of the airbag to the first airbag receiving portion of the first arm and secured at a second end of the airbag to the second airbag receiving portion of the second arm, the airbag configured to bias the first airbag receiving portion of the first arm and the second airbag receiving portion of the second arm apart upon inflation.

2. A mixing vehicle, as in claim 1, the locking apparatus further comprising a resilient member secured between the first arm and the second arm proximate the first airbag receiving portion and the second airbag receiving portion to bias the first clamping portion against a first surface of a pressure plate and the second clamping portion against a second surface of the pressure plate.

* * * * *